United States Patent [19]
Saito

[11] Patent Number: 5,649,042
[45] Date of Patent: Jul. 15, 1997

[54] PRE-CONNECTORIZED LOOSE TUBE CABLE

[75] Inventor: Masami Saito, Carrollton, Ga.

[73] Assignee: Lucent Technologies Inc., Murray Hill, N.J.

[21] Appl. No.: 570,144

[22] Filed: Dec. 11, 1995

[51] Int. Cl.$^6$ ............................................. G02B 6/44
[52] U.S. Cl. ........................ 385/109; 385/102; 385/106
[58] Field of Search ........................... 385/100–114, 93

[56] References Cited

U.S. PATENT DOCUMENTS 5,119,462  6/1992  Matsubara et al. ...................... 385/93
5,125,060  6/1992  Edmundson ........................... 385/100
5,416,874  5/1995  Giebel et al. .......................... 385/100

Primary Examiner—Grant T.H. Palmer

[57] ABSTRACT

A pre-connectorized loose tube cable protects the optical fibers as the fibers are being routed from the end of an outer sheath to the fiber distribution shelf. The pre-connectorized loose tube cable has a plurality of flexible tubes which are connected to a respective plurality of buffer tubes. The flexible tubes are securely attached to the ends of the buffer tubes and to the pre-connectorized loose tube cable by a capping epoxy and by heat shrinks. The flexible tube has a wall thickness which is greater than the minimum bend radius for the fibers. With such a wall thickness, the fibers are not bent past their minimum bend radius, and thus do not break, even if the flexible tube is bent up to an angle of one hundred eighty degrees.

13 Claims, 5 Drawing Sheets

PRE-CONNECTORIZED LOOSE TUBE CABLE

FIELD OF THE INVENTION

This invention relates to a loose tube optical fiber cable and, more particularly, to a pre-connectorized loose tube cable for reducing optical fiber breakage due to too sharp bending thereof.

BACKGROUND OF THE INVENTION

Many optical fiber cables are pre-connectorized loose tube cables which comprise a plurality of optical fibers. Because the optical fibers are thin and fragile, the pre-connectorized loose tube cables have various members along the length of the fibers for protecting the fibers from becoming bent or stressed, such as a buffer tube, an inner tension member extending along the length of the cable, and/or outer sheaths. The protective members reduce any signal loss or fiber breakage by limiting the amount in which the optical fibers are bent or otherwise exposed to external forces, such as tensile forces.

When the optical fibers in an optical cable are to be spliced to other fibers or components, the fibers must be separated from many of the protective members in the cable and routed to their respective coupling locations. Typically, each optical fiber is separated from the outer sheaths and the tension member and is routed within a single buffer tube with a number of other fibers toward the coupling locations for the fibers. At a region close to the termination points for the fibers, a fiber break-out separates the fibers within the buffer tube from each other and routes the individual fibers within respective furcation tubes to their respective coupling locations. The specific coupling locations for the optical fibers can vary but are often locations in a fiber distribution shelf or a splice closure.

In routing the optical fibers in a cable to their respective coupling locations, however, the optical fibers can become damaged within the furcation tube or within the buffer tube. Often, the individual optical fibers and their respective furcation tubes are bundled together within a spiral tube and routed as a group to the distribution shelf or closure. The optical fibers and furcation tubes can become intertwined with each other within the spiral tube and, at times, become so twisted that some of the optical fibers become bent or kinked, thereby introducing a signal loss or causing the fiber to break. The entanglement of the fibers within the spiral tube is therefore a problem when routing the fibers in a pre-connectorized loose tube cable to their points of termination. Additionally, when the fibers do become entangled, it is time consuming to untangle them so that each fiber may be directed to its proper location.

As is typical in the industry, the total length of each fiber is greater than the required distance so as to provide a slack length of fiber for the technician. When routing the fibers within a pre-connectorized loose tube cable to a distribution shelf, or similar type of unit, the slack length of buffer tube length is looped into coils and attached to the distribution shelf. The buffer tubes may also be gathered together within a spiral tube and routed from the end of the sheath toward the connectors in the distribution shelf.

Another significant cause of fiber bending is due to the routing of the buffer tubes, including the looping of the buffer tubes to reduce the amount of slack. The buffer tubes are typically comprised of polybutylene terephthalate (PBT), which is easily bent or kinked if the buffer tubes should become bent, such as in routing the fibers within the spiral tube or in looping the buffer tubes to reduce slack. When the buffer tube becomes kinked, the fibers within the buffer tube are bent at a sharp angle causing signal loss and, if the bend is less than the minimum allowable bend radius for the fibers, causing fiber breakage.

Because the fibers can easily break within the buffer tubes, the technician must take great care when handling the buffer tubes so as to prevent any kinking of the tubes. The time spent by the technician in handling the buffer tubes thus becomes relatively long whereby, as a consequence, the entire time for coupling a pre-connectorized loose tube cable to a distribution shelf is significantly increased.

One approach to reducing the chance that the buffer tubes will become kinked is to reduce the overall length of the buffer tubes. In this manner, the buffer tubes may not need to be looped in order to reduce the slack. While a shorter buffer tube may reduce the chance that the fibers become bent due to a kink in the buffer tube, a shorter buffer tube increases the distance that the fiber is contained within only the furcation tube. Because the optical fibers are more vulnerable to external forces when within the furcation tube only, the fibers are preferably contained within the buffer tube rather than the furcation tube. Thus, even though the buffer tubes may cause fiber breakage due to a kink in the buffer tube, the fibers are preferably left within the buffer tube in order to protect the fibers.

A need therefore exists for a device or method for protecting optical fibers as the fibers are being routed, such as from a pre-connectorized loose tube cable to the coupling points for the fibers. The device or method for protecting the fibers must be able to bend so that the fibers can be routed to the coupling points, yet cannot bend past the minimum bend radius for the optical fibers. A need also exists for a device or method for permitting a technician to couple a pre-connectorized loose tube cable in a shorter period of time than has heretofore been possible.

SUMMARY OF THE INVENTION

The present invention, in a preferred embodiment thereof, is a pre-connectorized loose tube optical fiber cable which is capable of reducing fiber breakage. The pre-connectorized loose tube cable has an outer sheath and a flexible tube which extends from an end of the outer sheath. The flexible tube holds a plurality of optical fibers and has a wall thickness which is greater than a minimum bend radius of the optical fibers. With such a wall thickness, the optical fibers do not break even when the flexible tube is bent up to an angle of one hundred and eighty degrees. Since the flexible tube can be bent about large angles, the technician can more easily and quickly route the fibers to the distribution shelf.

The flexible tube is preferably formed from polyvinylchloride and attaches to the end of a buffer tube in the pre-connectorized loose tube cable. The flexible tube has an inner diameter which is equal to or slightly greater than the outer diameter of the buffer tube so that the flexible tube can be placed over the end of the buffer tube. In attaching the flexible tube to the buffer tube, an epoxy is inserted around the flexible tube and heat shrinks are placed around the flexible tube and around the outer sheath of the cable. A fiber break-out may be attached to the end of each flexible tube for separating the optical fibers and for placing the fibers in their individual furcation tubes.

The principles and features of the present invention will be more readily apparent and understood from the following detailed description, read in conjunction with the accompanying drawings.

DETAILED DESCRIPTION

Figure 1:
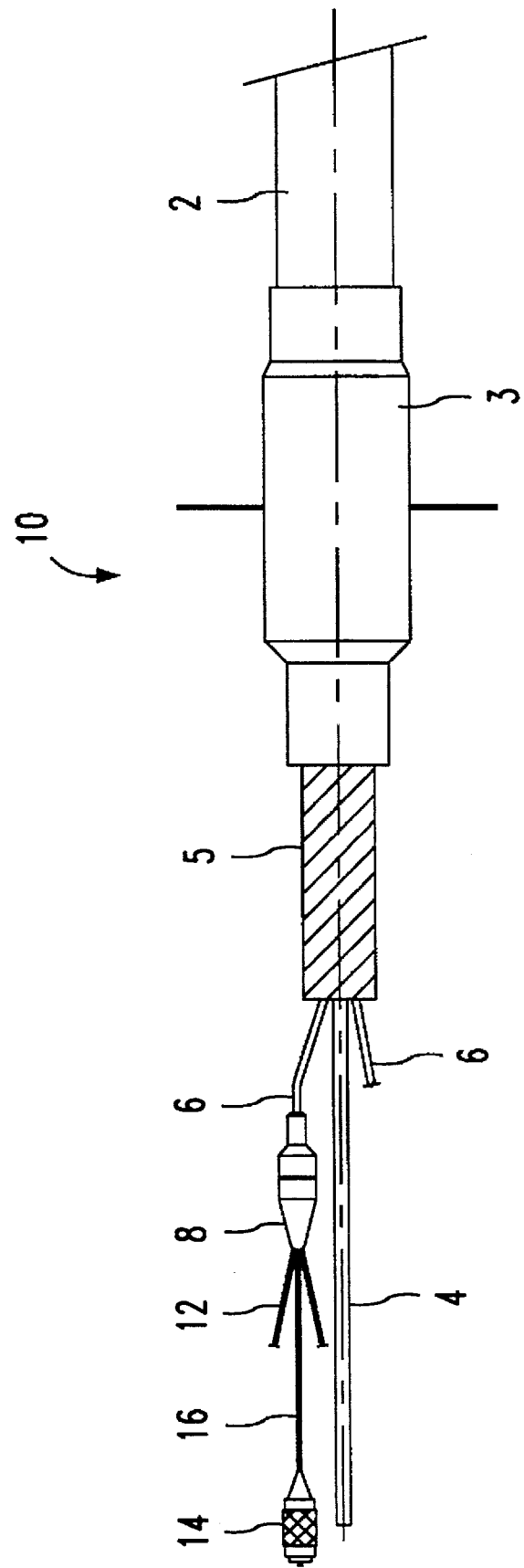
FIG. 1 is a side view of a conventional pre-connectorized loose tube cable.

With reference to FIG. 1, a commonly used pre-connectorized multi-fiber cable is a pre-connectorized loose tube cable 10 which has a plurality of buffer tubes 6 with each buffer tube holding a number of optical fibers 12. The buffer tubes 6 are protected within a plastic spiral protector 5 along with a tension member 4. A fiber break-out 8 is connected to the end of each buffer tube 6 for separating the optical fibers 12 and for placing the optical fibers 12 in their respective furcation tubes 16. The optical fibers 12 can be coupled to another optical fiber or to another component, such as with a connector 14. An outer sheath 2 of the cable 10 terminates within a blockage 3.

Figure 2:
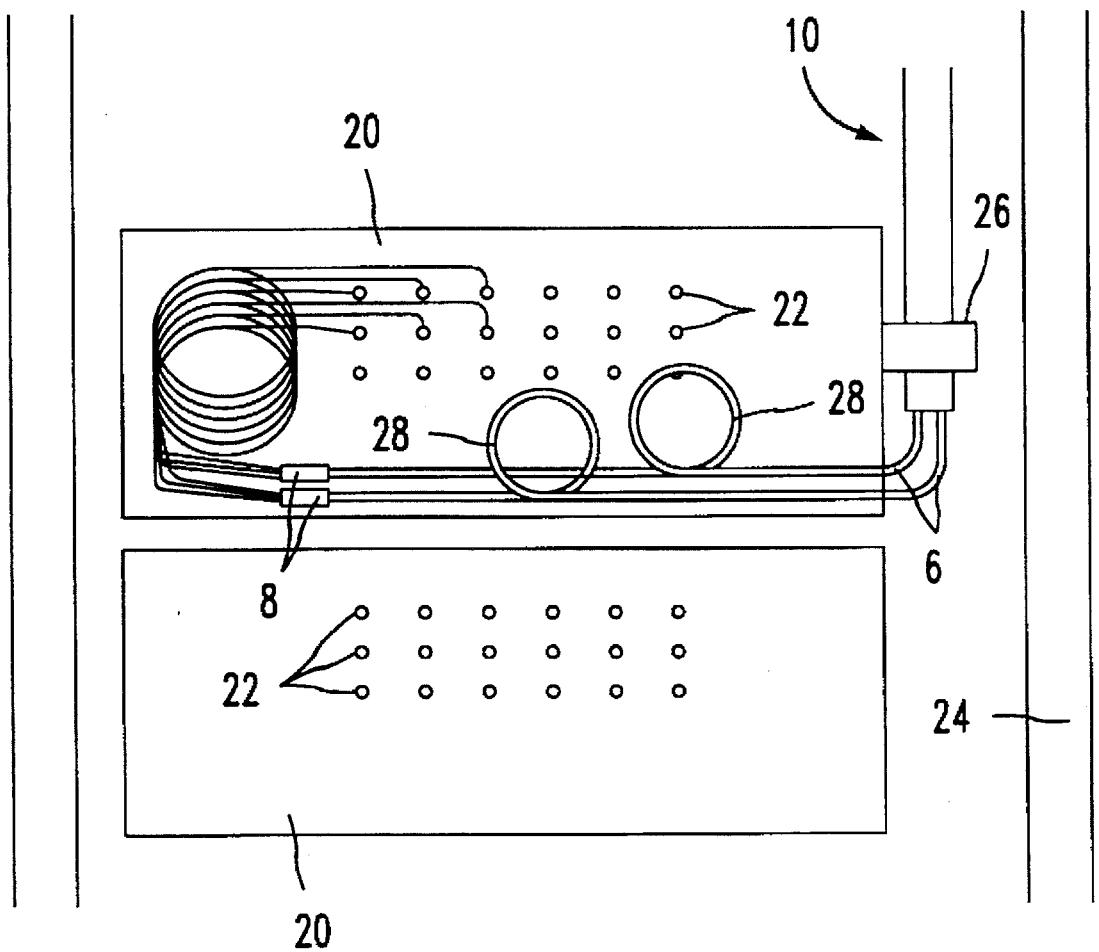
FIG. 2 is a diagrammatic view of a conventional pre-connectorized loose tube cable connected to a distribution shelf.

When connecting the pre-connectorized loose tube cable 10 to a fiber distribution shelf 20 within a distribution frame 24, as shown in FIG. 2, the pre-connectorized loose tube cable 10 is mounted to the distribution shelf 20, such as with a cable holder or bracket 26. The individual buffer tubes 6 are typically looped to form coils 28 so that the slack length of the fibers 12 is reduced. The fibers 12 within a buffer tube 6 are separated from each other by a fiber break-out 8 and the individual fibers 12 are then routed to their respective adapters 22 in the distribution shelf 20. While only two buffer tubes 6 have been shown in this figure, it should be understood that a pre-connectorized loose tube cable 10 often contains a larger number of buffer tubes 6.

In the normal handling of the buffer tubes 6, they are easily kinked when they are bent and routed along the shelf 20. When a buffer tube 6 becomes kinked, the optical fibers 12 within the buffer tube 6 are bent through a large angle, thereby causing signal loss and, more significantly, fiber breakage if the bend is smaller than the minimum bend radius of the fibers 12. Consequently, the technician must route the buffer tubes 6 and form loops 28 to reduce slack yet prevent the buffer tubes 6 from becoming kinked or otherwise bent past the minimum bend radius for the fibers 12.

Figure 3:
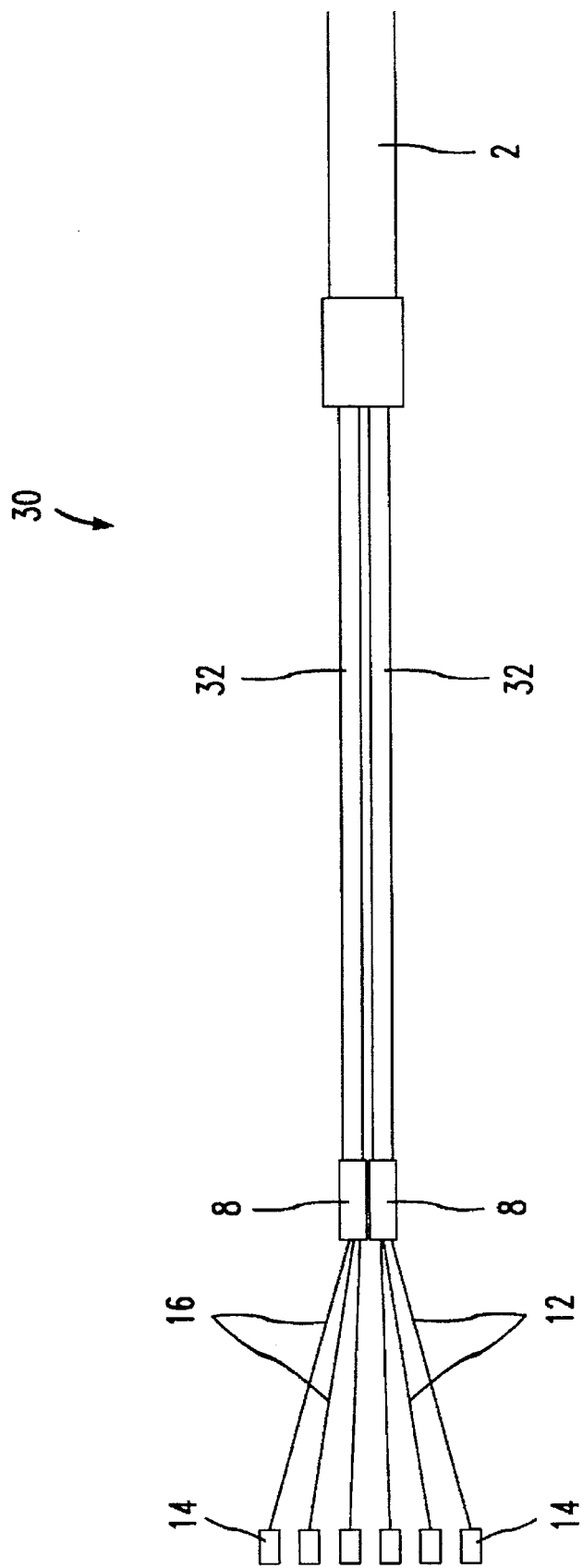
FIG. 3 is a side view of a pre-connectorized loose tube cable according to a preferred embodiment of the invention.

With reference to FIG. 3, a pre-connectorized loose tube cable 30 according to a preferred embodiment of the invention comprises a number of flexible tubes 32 each holding a plurality of optical fibers 12. The flexible tubes 32 are for routing the optical fibers 12 from an end of the outer sheath 2 to a fiber break-out 8. The fiber break-out 8 is connected to an end of each flexible tube 32 for separating the optical fibers 12 within each flexible tube 32 and for placing each fiber 12 within its own furcation tube 16. A set of optical connectors 14 are connected to the ends of the optical fibers 12 for coupling the optical fibers 12 to the adapters 22 in the fiber distribution shelf 20.

Figure 4A:
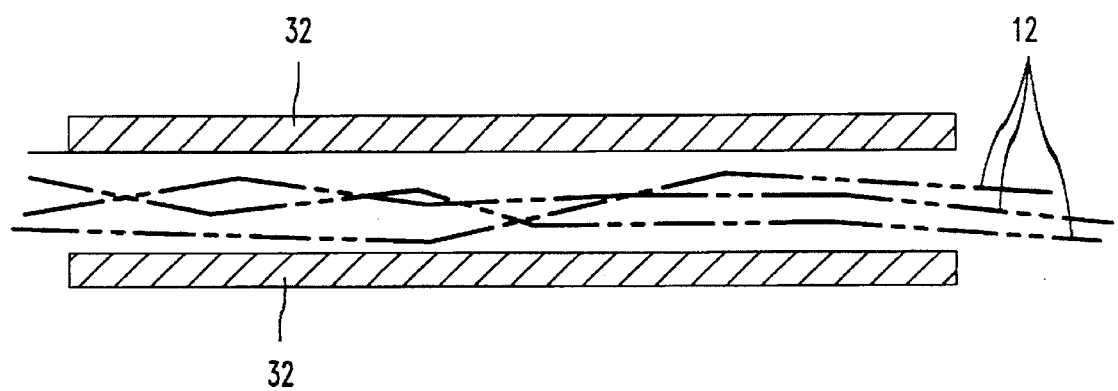
FIG. 4(A) is a cross-sectional side view of a flexible tube used in the pre-connectorized lease tube cable of FIG. 3.
Figure 4B:
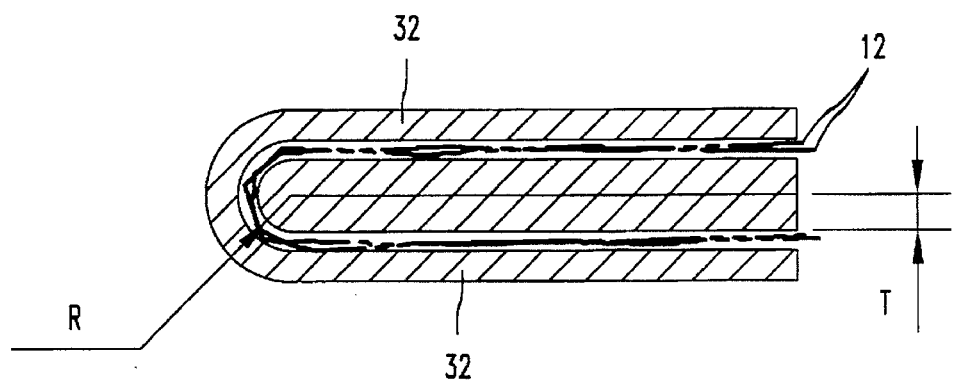
FIG. 4(B) is a cross-sectional side view of the flexible tube of FIG. 4(A) bent at an angle of 180 degrees.

In addition to routing the optical fibers 12, the flexible tubes 32 according to the invention also prevent the optical fibers 12 from becoming bent past the minimum bend radius and therefore prevent fiber breakage. As best seen in FIGS. 4(A) and 4(B), each flexible tube 32 holds a number of optical fibers 12 and has walls formed of a certain predefined thickness T, which is greater than the minimum bend radius for the fibers 12. With the thickness T of the walls being greater than the minimum bend radius for the fibers 12, the fibers 12 cannot be bent past or to less than the minimum bend radius R, even if the flexible tube 32 is bent through an angle of 180 degrees, as illustrated in FIG. 4(B). Consequently, the flexible tube 32 can be easily and quickly bent and routed along the distribution shelf 20 without breaking the optical fibers 12.

The flexible tubes 32 of the invention are preferably formed from polyvinylchloride (PVC), but may be formed from any suitable material, such as vinyl or teflon. The exact dimension for the wall thickness T varies according to the size of the optical fiber 12, the coating material, adhesive force between the fiber and coating material, as well as other factors. For instance, an optical fiber 12 which is comprised of a 125 micron outer diameter glass fiber having a coating thickness of 62.5 microns has a minimum bend radius of 1.0 mm. Consequently, the thickness of the flexible tube 32 should be at least 1.0 mm to ensure that the fibers 12 do not break when the flexible tube 32 is bent at an angle up to one hundred eighty degrees.

As an example, each flexible tube 32 may hold a total of twelve optical fibers 12 with each optical fiber 12 having an outer diameter of 250 microns and each buffer tube 6 having an outer diameter of approximately 3.0 mm. The inner diameter of the flexible tube 32 is approximately 3.2 mm and the outer diameter is approximately 6.2 mm, whereby the wall thickness T of the flexible tube 32 is approximately 1.5 mm. Since the wall thickness T is greater than the minimum bend radius for the optical fibers 12, the flexible tube 32 can be bent up to an angle of one hundred eighty degrees without resulting in any fiber breakage.

In addition to preventing fiber breakage, the pre-connectorized loose tube cable 30 having the flexible tubes 32 can have its fibers 12 coupled to a distribution shelf 20 in a shorter period of time. Since the flexible tube 32 can be bent at an angle of one hundred eighty degrees without kinking and without causing any fiber breakage, the technician can route the flexible tubes 32 quicker and with less chance of, or concern about, fiber damage in comparison to the routing of the optical fibers 12 within the buffer tubes 6. The entire process of coupling the fibers 12 to the distribution shelf 20 can therefore be performed more quickly and thus more efficiently.

Figure 5A:
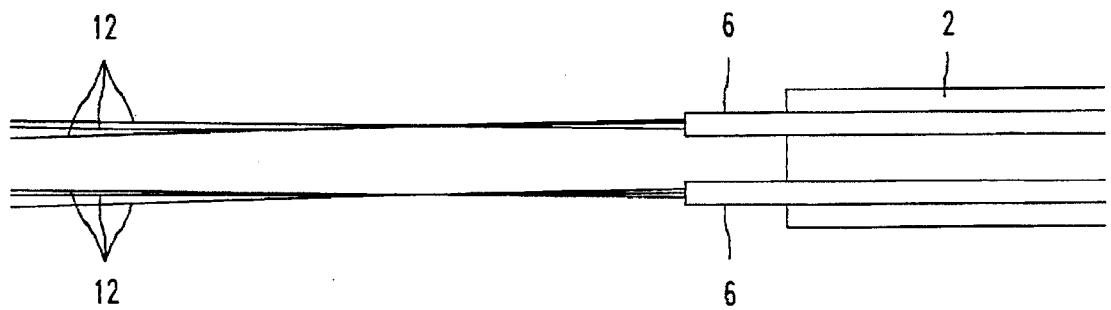
FIGS. 5(A), (B), and (C) illustrate steps for manufacturing the pre-connectorized loose tube cable of FIG. 3.
Figure 5B:
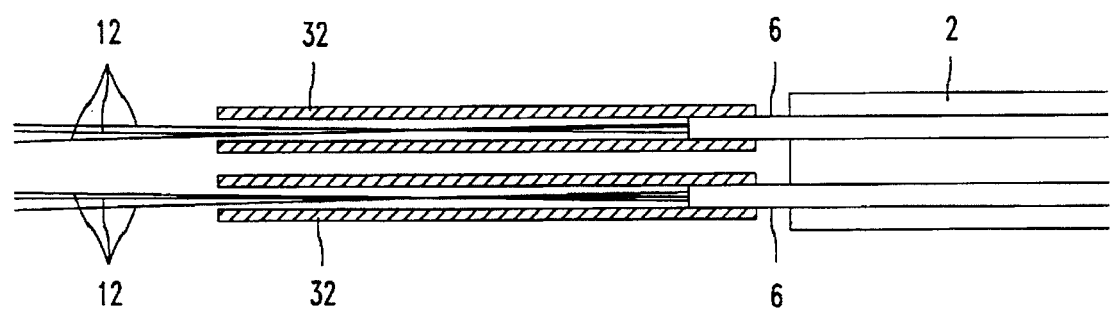
Figure 5C:
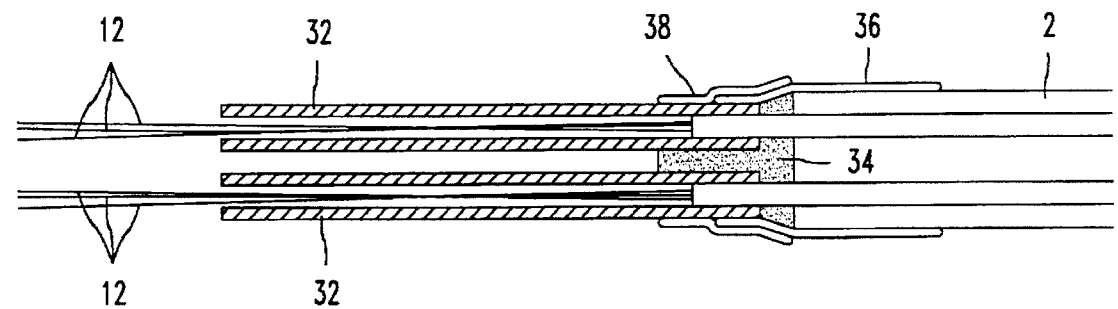

The steps of a method of fabricating a pre-connectorized loose tube cable 30 according to the invention are shown in FIGS. 5(A) to 5(C). As shown in FIG. 5(A), an outer sheath 2 of a cable is removed and the buffer tubes 6 are terminated at a position proximate the end of the outer sheath 2. At this stage, the optical fibers 12 extend beyond the buffer tubes 6.

Next, as shown in FIG. 5(B), a flexible tube 32 according to the invention is placed over each buffer tube 6 with the optical fibers 12 being placed within the flexible tube 32. In order to hold the flexible tube 32 firmly to the buffer tube 6, the inner diameter of the flexible tube 32 should be equal to, or only slightly larger, than the outer diameter of the buffer tubes 6. As will be apparent to those skilled in the art, the flexible tube 32 can be attached or coupled to the buffer tube 6 in various other ways.

As shown in FIG. 5(C), a capping epoxy 34 is inserted between the flexible tubes 32 and is cured to fix the flexible tubes 32 in position. A first heat shrink 36 is placed over the outer sheath 2 of the pre-connectorized loose tube cable 30 and partially over the flexible tubes 32 and a second heat shrink 38 is applied over the first heat shrink 36 and partially over the flexible tubes 32. In this manner, the flexible tubes 32 are securely attached to the buffer tubes 6 and also to the outer sheath 2 of the cable. While any suitable capping epoxy 34 and heat shrinks 36 and 38 may be used, the capping epoxy 34 is preferably methacrylate and the heat shrinks are preferably polyolefin.

While not shown, fiber break-outs 8 are subsequently attached to the ends of the flexible tubes 32 to separate the fibers 12 from each other and to place the optical fibers 12 within individual furcation tubes 16. Also, connectors 14 are placed at the tips of the optical fibers 12 so that the optical fibers 12 may be connected to adapters 22 in the fiber distribution shelf 20.

While the invention has been described with reference to a pre-connectorized loose tube cable 30 which is intended to be connected to a fiber distribution shelf 20, it should be understood that the invention can be applied to any type of optical cable. In fact, the flexible tube 32 according to the invention can be used to route optical fibers 12 in any situation where a plurality of optical fibers are easily damaged by becoming bent.

The foregoing has been illustrative of the features and principles of the present invention. Various changes or modifications to the invention may be apparent to workers in the art without departure from the spirit and scope of the invention.

For example, the pre-connectorized loose tube cable 30 is not limited to only two flexible tubes 32 but may have any number of flexible tubes 32. Also, the flexible tube 32 need not be connected to a buffer tube 6 but may be connected to another type of protective member or structure. Furthermore, the flexible tube 32 could extend along the entire length of the outer sheath 2. As should be apparent to one skilled in the art, the flexible tube 32 is not limited to holding only three optical fibers, as shown, or to twelve optical fibers 12, but may hold any practical number of optical fibers.

Additionally, the buffer tubes 6 are typically color coded in order to distinguish the fibers 12 in one buffer tube 6 from the fibers 12 in another buffer tube 6. In order to provide some manner by which the flexible tubes 32 can be distinguished from each other, the flexible tubes 32 may have some identifying indicia, such as a label.

I claim:

1. A pre-connectorized loose tube optical fiber cable for reducing fiber breakage, comprising:
   a flexible tube;
   a plurality of optical fibers passing through said flexible tube; and
   an outer sheath surrounding a portion of each of said plurality of optical fibers and having a diameter larger than the diameter of said flexible tube;
   wherein said flexible tube extends from an end of said outer sheath and has a wall thickness which is greater than a minimum bend radius for said optical fibers, whereby said optical fibers do not break when said flexible tube is bent to any angle up to one hundred eighty degrees.

2. The pre-connectorized loose tube cable as set forth in claim 1, further comprising a buffer tube for holding said optical fibers, an end of said buffer tube terminating approximately near an end of said outer sheath and said end of said buffer tube being connected to an end of said flexible tube.

3. The pre-connectorized loose tube cable as set forth in claim 2, wherein an inner diameter of said flexible tube is no less than an outer diameter of said buffer tube.

4. The pre-connectorized loose tube cable as set forth in claim 2, further comprising an epoxy for attaching said flexible tube to said buffer tube.

5. The pre-connectorized loose tube cable as set forth in claim 1, wherein said flexible tube is comprised of polyvinylchloride.

6. The pre-connectorized loose tube cable as set forth in claim 1, further comprising a second flexible tube for containing a second plurality of optical fibers.

7. The pre-connectorized loose tube cable as set forth in claim 1, further comprising a tension member extending along a length of said outer sheath.

8. The pre-connectorized loose tube cable as set forth in claim 1, further comprising a heat shrink for attaching said flexible tube to said outer sheath.

9. A method of fabricating a pre-connectorized loose tube cable having a buffer tube holding a plurality of optical fibers and an outer sheath, comprising the steps of:
   terminating said buffer tube near an end of said outer sheath;
   coupling an end of a flexible tube having a wall thickness greater than a minimum bend radius of said optical fibers to an end of said buffer tube and passing said optical fibers through said flexible tube; and
   affixing said flexible tube to said buffer tube and to said outer sheath.

10. The method as set forth in claim 9, wherein said coupling step comprises the step of inserting said end of said buffer tube into said end of said flexible tube.

11. The method as set forth in claim 9, wherein said step of affixing comprises the steps of placing an epoxy around said end of said flexible tube, placing a first heat shrink around said end of said flexible tube and said outer sheath, and placing a second heat shrink around said first heat shrink and said flexible tube.

12. A termination arrangement for a loose tube optical fiber cable for reducing fiber breakage, comprising:
   a hollow flexible tube member for receiving and containing optical fibers extending from an end of the loose tube cable, said cable having an outer sheath having a larger diameter than the diameter of said hollow flexible tube member;
   means for joining said flexible tube member to said outer sheath; and
   said flexible tube member having a wall thickness which is greater than the minimum bend radius for the optical fibers;
   whereby when said flexible tube member containing said fibers is bent through an angle up to and including one hundred eighty degrees, the fibers are not bent to a radius less than the allowable minimum bend radius thereof.

13. The arrangement as set forth in claim 12, further comprising a buffer tube terminating near said end of said loose tube cable, said flexible tube being joined to said buffer tube.

* * * * *